Patented Apr. 11, 1939

2,153,658

UNITED STATES PATENT OFFICE 2,153,658

PROCESS FOR THE MANUFACTURE OF HYDROGEN PEROXIDE FROM BARIUM DIOXIDE AND PHOSPHORIC ACID

Issar Budowski, Boulogne-sur-Seine, France, assignor to Compagnie Parisienne de Produits Chimiques, Paris, France, a company of France No Drawing. Application March 18, 1938, Serial No. 196,628. In France June 9, 1937

6 Claims. (Cl. 23—207)

The present invention has for its object a process for the manufacture of hydrogen peroxide from barium dioxide and phosphoric acid.

All the known processes of this type generally operated at very low temperatures, for instance, at temperatures varying from 0 to 6° C. approximately. Such low temperatures are necessary for the following three reasons:

In the first place, they limit the destruction of hydrogen peroxide during its formation.

In the second place, they avoid any local overheating which could be due to the exothermic reaction between barium dioxide and phosphoric acid.

Finally, such low temperatures protect the barium dioxide particles from being enveloped by the barium phosphate which is formed during the operation.

However, the cooling at such low temperatures involves disadvantages which are due to the fact that the precipitate containing phosphate salts and formed during the operation occupies a great volume, is difficultly filterable, and it is therefore impossible to obtain concentrated hydrogen peroxide. In fact, the reaction mixture assumes the form of a thick paste which cannot be readily agitated. Even if from the beginning only a small amount of dioxide has been used, a washing of the precipitate which occupies a considerable volume with a great quantity of water becomes absolutely necessary.

One of the objects of my invention is to obviate these drawbacks. According to one feature, the new process consists in preparing a mixture by adding barium dioxide to phosphoric acid at a relatively low temperature, in interrupting the addition of dioxide after a certain amount thereof has been mixed with the phosphate, in maintaining thereafter during a certain time the low temperature, in heating the mixture again, in cooling it thereafter and in adding thereto once again barium dioxide, this sequence of operations being repeated a certain number of times as required by the quality of the final product.

This operation permits of avoiding all of the above indicated drawbacks. In fact, the phosphate precipitate occupies a smaller volume, whilst the output of hydrogen peroxide is by no means diminished.

The heating is generally effected at 60–70° C., and does not involve any of the above mentioned risks. In fact, when the mixture is heated, it does not contain any more dissolved barium dioxide, as the whole introduced amount thereof has been transformed. Consequently, the formation of hydrogen peroxide is stopped at that time. On the other hand the absence of a direct reaction between the dioxide and the phosphoric acid prevents any overheating. The destruction of already formed hydrogen peroxide is neither to be feared, as the temperature of destruction is superior to 70° C., and as the acid phosphates and the phosphoric acid are perfect stabilizers. Consequently, the output of hydrogen peroxide is not diminished. On the contrary, the precipitate occupying a smaller volume may be more readily washed, thus still increasing the output.

In the manufacture of hydrogen peroxide, it is indispensable that the product should be practically free of solid particles, and that its acidity should correspond to the one prescribed and admitted by the rules in the different countries. This may be realized by distilling the product obtained by the above mentioned process.

Another object of this invention is however to avoid this distillation. According to this feature, the process consists in interrupting the addition of barium dioxide into phosphoric acid when the mixture is still acid, in heating the mixture, in introducing an excess of carbonate, in filtering the product, and thereafter adding a new amount of sulphuric acid and operating a new filtering.

This feature is very advantageous for obtaining pure $H_2O_2$ solutions and none of the known methods permit of realising similar results.

In fact, when the mixture being still acid, the addition of barium dioxide is interrupted, relatively important amounts of primary barium phosphate ($Ba(H_2PO_4)_2$) which is solid, remain in solution. Nothing would be changed by an addition of sulphuric acid effected at this time for the reason that after having transformed the barium phosphate into sulphate, and after having precipitated this sulphate, it would release phosphoric acid and this latter would transform a new amount of secondary phosphate ($BaHPO_4$) into primary phosphate ($Ba(H_2PO_4)_2$) which latter is soluble.

If a soluble sulphate is used instead of sulphuric acid, this would neither give an acceptable solution of the problem. In fact, if this salt finally forms a soluble phosphate, it will simply produce an increase of the solid residuum of the liquor, whilst in the case where such a sulphate forms an insoluble salt, it will simply introduce a foreign metal (the metal combined with the group $SO_4$) into the barium phosphate which will later serve for the recovery of phosphoric acid. Such circumstances will of course greatly complicate this latter operation of recovery.

It is of course also possible to interrupt the addition of barium dioxide after the reaction mixture has become alkaline and to bring thereafter the mixture by suitable additions of diluted sulphuric acid, to the pH of the secondary barium phosphate ($BaHPO_4$). But such an operation is not advantageous, as, on the one hand, it involves a serious decrease of the output of hydrogen peroxide, and as, on the other hand, it renders the precipitate of barium salt incomplete.

In fact, great amounts of hydrogen peroxide are decomposed by the alkalinity of the mixture, and this decomposition can cause considerable losses. This is due to the fact that sulphuric acid is introduced into the mixture at a very slow rate, so that the alkalinity may subsist a relatively long time. It must also be observed that the addition of sulphuric acid reestablishes the equilibrium between the precipitate and the solution, and as the formation of barium phosphate is not quantitative, the barium is once again dissolved in part in the form of primary phosphate (Ba(H$_2$PO$_4$)$_2$) and in part in the form of barium phosphate, (this depending upon the product of stabilization).

The process according to the invention permits of obviating all the aforesaid drawbacks by the fact that as above stated the mixture is heated, an excess of barium carbonate introduced, and a new amount of sulphuric acid added thereto.

According to this new process and more particularly to a preferred operating method, after the addition of barium dioxide has been interrupted, the mixture is agitated so as to render the reaction as complete as possible. The mixture is then heated up to 35° C. approximately, this heating causing no loss of hydrogen peroxide, as the whole amount of introduced barium dioxide has already been combined. The mixture is then supplied with a certain amount of a carbonate and preferably of barium carbonate. This salt is introduced in excess and during this operative step, the mixture is continuously agitated. The mixture is then neutralized, but should never become alkaline. The heating is effected for the purpose of accelerating and completing the reaction between the carbonate and the primary phosphate (Ba(PO$_4$H$_2$)$_2$). In this way, barium phosphate is wholly transformed into secondary barium phosphate (BaHPO$_4$). The mixture is moreover filtered and a small amount of sulphuric acid is added thereto in order to precipitate the small residue of barium which may still remain in solution. The liquor not being any more in contact with a precipitate of sulphate, a new amount of barium cannot be dissolved or enter the solution after the reestablishment of the equilibrium. The mixture is then once again filtered and the obtained liquid is pure hydrogen peroxide. The solid residue of such a solution of hydrogen peroxide at 8.5% attain only 0.004 gram per 10 cm.$^3$ of solution. As regards its acidity, it is much below the highest acid contents admitted by the rules in Germany, in France, the United States, etc.

An example of the method of carrying out the above indicated process is given herebelow:

Example 1512 kgs. of phosphoric acid at 24% are cooled up to 1° C. 625 kgs. of barium dioxide of commercial purity (80 to 90% of BaO$_2$) in the form of a very finely divided powder, are introduced into this acid at a very slow rate while agitating the liquor. During the reaction the temperature is maintained between 0° and 4° C. After the two thirds (66%) of the above indicated amount of barium dioxide have been introduced into the mixture, the further introduction of barium dioxide is interrupted and 15 minutes afterwards the temperature increased up to 20° C. The temperature is thereafter lowered up to 2° C. and the introduction of barium dioxide is continued. 15 minutes after the end of the operation, the temperature is allowed to slowly increase. After one hour the mixture is heated up to 35° C. and barium carbonate is added thereto. This addition is continued until the reaction with litmus paper proves that the mixture has been neutralized. The mixture is thereafter filtrated and the obtained liquor represents an amount of 1250 litres containing 8 to 8.5% of H$_2$O$_2$.

Obviously, the said invention is by no means limited to the precise methods and proportions which are indicated and which have been simply chosen by way of example.

Having now described my invention, what I claim as new and desire to secure by Letters Patent is:

1. A process of manufacture of hydrogen peroxide by means of barium dioxide and phosphoric acid consisting in introducing barium dioxide into phosphoric acid, in interrupting the addition of barium dioxide when the mixture is still acid, in heating this mixture, in introducing an excess of a carbonate, and in filtering the product.

2. A process of manufacture of hydrogen peroxide by means of barium dioxide and phosphoric acid consisting in introducing barium dioxide into phosphoric acid, in interrupting the addition of barium dioxide when the mixture is still acid, in heating this mixture, in introducing an excess of a carbonate, in filtering said mixture in introducing therein an amount of sulphuric acid which is sufficient to precipitate any residual barium salts and to neutralize the liquor, and in filtering said mixture once again.

3. A process of manufacture of hydrogen peroxide by means of barium dioxide and phosphoric acid consisting in introducing barium dioxide into phosphoric acid, in interrupting the addition of barium dioxide when the mixture is still acid, in heating this mixture, in introducing an excess of barium carbonate, and in filtering the product.

4. A process of manufacture of hydrogen peroxide by means of barium dioxide and phosphoric acid consisting in introducing barium dioxide into phosphoric acid, in interrupting the addition of barium dioxide when the mixture is still acid, in heating this mixture, in introducing an excess of barium carbonate, and in filtering the product, the heating temperature being of approximately 35° C.

5. A process of manufacture of hydrogen peroxide by means of barium dioxide and phosphoric acid consisting in introducing barium dioxide into phosphoric acid, in interrupting the addition of barium dioxide when the mixture is still acid, in heating this mixture, in introducing an excess of barium carbonate, and in filtering the product, and further introducing in the liquor a small amount of sulphuric acid, and filtering said mixture once again, the amount of sulphuric acid being just sufficient to neutralize this mixture.

6. A process of manufacture of hydrogen peroxide by means of barium dioxide and of phosphoric acid, of the kind in which these two substances are mixed together at relatively low temperatures, comprising interrupting the addition of barium dioxide after a certain amount thereof has been introduced in the acid, conserving the low temperature for a certain time, heating the mixture, cooling it thereafter, and introducing fresh amounts of barium dioxide.

ISSAR BUDOWSKI.